US012288349B2

(12) United States Patent
Jeon et al.

(10) Patent No.: US 12,288,349 B2
(45) Date of Patent: Apr. 29, 2025

(54) METHOD FOR PERFORMING SIMULTANEOUS LOCALIZATION AND MAPPING AND DEVICE USING SAME

(71) Applicants: SAMSUNG ELECTRONICS CO., LTD., Suwon-si (KR); University of Seoul Industry Cooperation Foundation, Seoul (KR)

(72) Inventors: Myungjae Jeon, Yongin-si (KR); Kichul Kim, Seoul (KR); Yongkyu Kim, Hwaseong-si (KR); Hongseok Lee, Seoul (KR); San Kim, Changwon-si (KR); Hyekwan Yun, Seoul (KR); Donggeun Lee, Bucheon-si (KR)

(73) Assignees: SAMSUNG ELECTRONICS CO., LTD., Suwon-si (KR); University of Seoul Industry Cooperation Foundation, Seoul (KR)

(*) Notice: Subject to any disclaimer, the term of this patent is extended or adjusted under 35 U.S.C. 154(b) by 614 days.

(21) Appl. No.: 17/516,990

(22) Filed: Nov. 2, 2021

(65) Prior Publication Data
US 2022/0254046 A1    Aug. 11, 2022

(30) Foreign Application Priority Data

Feb. 4, 2021 (KR) .................. 10-2021-0016286

(51) Int. Cl.
G06T 7/579 (2017.01)
G02B 27/01 (2006.01)
G06T 7/80 (2017.01)

(52) U.S. Cl.
CPC .......... G06T 7/579 (2017.01); G02B 27/0101 (2013.01); G02B 27/017 (2013.01);
(Continued)

(58) Field of Classification Search
CPC .... G02B 2027/0138; G02B 2027/0178; G02B 2027/0187; G02B 27/0101; G02B 27/017;
(Continued)

(56) References Cited

U.S. PATENT DOCUMENTS 5,764,231 A * 6/1998 Ray .................... H04N 1/00201
345/419
2016/0327395 A1   11/2016 Roumeliotis et al.
(Continued)

FOREIGN PATENT DOCUMENTS

| CN | 201811058356 | * | 9/2018 | ............. G06F 16/71 |
| CN | 108648240 | * | 10/2018 | ............... G06T 7/80 |

(Continued)

OTHER PUBLICATIONS

Zhang et al., "Visual-Inertial Odometry on Chip: An Algorithm-and-Hardware Co-design Approach," MIT, 2017, Total 10 pages.
(Continued)

*Primary Examiner* — Zhiyu Lu
(74) *Attorney, Agent, or Firm* — Sughrue Mion, PLLC

(57) ABSTRACT

Provided is an accelerator provided in an electronic device and configured to perform simultaneous localization and mapping (SLAM), the accelerator including a factor graph database, a memory, and a back-end processor, wherein the back-end processor is configured to receive a first piece of data corresponding to map points and camera positions from the factor graph database, convert the received first piece of data into a matrix for the map points and a matrix for the camera positions, store, in the memory, results obtained by performing an optimization calculation on the matrix for the map points and a matrix for at least one camera position, among the camera positions, corresponding to the map
(Continued)

points, and obtain a second piece of data optimized with respect to the first piece of data based on the results stored in the memory.

14 Claims, 13 Drawing Sheets

(52) U.S. Cl.
CPC ............ *G02B 27/0179* (2013.01); *G06T 7/80* (2017.01); *G02B 2027/0138* (2013.01); *G02B 2027/0178* (2013.01); *G02B 2027/0187* (2013.01); *G06T 2207/10028* (2013.01); *G06T 2207/20021* (2013.01)

(58) Field of Classification Search
CPC ................. G02B 27/0179; G06T 1/60; G06T 2207/10028; G06T 2207/20021; G06T 7/579; G06T 7/73; G06T 7/80
See application file for complete search history.

(56) References Cited

U.S. PATENT DOCUMENTS

| | | | |
|---|---|---|---|
| 2017/0186164 A1* | 6/2017 | Seetharaman | ....... G06V 20/647 |
| 2018/0189587 A1 | 7/2018 | Mandal et al. | |
| 2020/0043189 A1 | 2/2020 | Bao et al. | |

FOREIGN PATENT DOCUMENTS

| | | | | |
|---|---|---|---|---|
| CN | 110076277 | * | 8/2019 | ............... G06T 7/73 |
| CN | 110189382 | * | 8/2019 | ............... G06T 7/75 |
| CN | 110675307 | * | 1/2020 | ............... G06T 7/11 |
| CN | 108986037 | * | 6/2020 | ............ G06V 20/46 |
| KR | 10-1206213 B1 | | 11/2012 | |
| KR | 10-1499384 B1 | | 3/2015 | |
| KR | 10-2017-0006587 A | | 1/2017 | |

OTHER PUBLICATIONS

Suleiman et al., "Navion: A 2mW Fully Integrated Real-Time Visual-Inertial Odometry Accelerator for Autonomous Navigation of Nano Drones," MIT, 2019, Total 14 pages.

Liu et al., "ICE-BA: Incremental, Consistent and Efficient Bundle Adjustment for Visual-Inertial SLAM," 2018 IEEE/CVF Conference on Computer Vision and Pattern Recognition, Dec. 17, 2018, pp. 1974-1982.

Communication issued Jul. 11, 2022 by the European Patent Office in counterpart European Patent Application No. 21218438.6.

Carlone, Luca et al., "Attention and Anticipation in Fast Visual-inertial Navigation", IEEE Transactions on Robotics, IEEE Service Center, Piscataway, NJ, US, vol. 35, No. 1, Feb. 1, 2019, pp. 1-20, XP011708901.

Liu, Haomin et al., "ICE-BA: Incremental, Consistent and Efficient Bundle Adjustment for Visual-Inertial SLAM", 2018 IEEE/CVF Conference on Computer Vision and Pattern Recognition, IEEE, Jun. 18, 2018, pp. 1974-1982, XP033476162.

* cited by examiner

METHOD FOR PERFORMING SIMULTANEOUS LOCALIZATION AND MAPPING AND DEVICE USING SAME

CROSS-REFERENCE TO RELATED APPLICATION

This application claims priority to Korean Patent Application No. 10-2021-0016268, filed on Feb. 4, 2021, in the Korean Intellectual Property Office, the disclosure of which is incorporated by reference herein in its entirety.

BACKGROUND

1. Field

Example embodiments of the present disclosure relate to a method of accelerating calculations for simultaneous localization and mapping (SLAM) and an accelerator using the method.

2. Description of Related Art

A map of a virtual space may be prepared by analyzing images received from a sensor such as a camera and by setting coordinates. Such a map of a virtual space may be applied to a wearable electronic device (for example, smart glasses or the like) which a user may put on his/her body part. A user of a wearable electronic device may view a display on which virtual objects or information are combined with a real environment. Moreover, maps of virtual spaces are widely used in various fields such as autonomous mobile robots and automobiles.

Simultaneous localization and mapping (SLAM) may refer to a technique for preparing a map of a virtual space in real time. Various devices may update a map of a virtual space in real time through SLAM.

SLAM may be implemented by using a front end which receives sensing data from a sensor and performs a key point extraction calculation and a 3D spatial coordinate calculation, and a back end which optimizes accumulated errors in data acquired from the front-end. In particular, the amount of calculation required for the back end to perform optimization may be determined according to the size of a map, the size and precision of sensing data, and the like.

When the related SLAM technology is applied to a wearable electronic device, a method of equipping the wearable electronic device with a low-end processor, a method of equipping the wearable electronic device with a high-end processor, or a method of connecting the wearable electronic device to an external device (for example, a smartphone) by wire may be used.

When a low-end processor is provided in a wearable electronic device, the speed of optimization calculation of a back end is low, and thus a map of a virtual space may not be correct because of accumulated errors. When a high-end processor is provided in a wearable electronic device, the size of a battery and the overall size of the wearable electronic device may increase because of an increase in power consumption. In addition, due to an increase in the weight of the wearable electronic device, a user may not be comfortable while wearing the wearable electronic device.

Recently, research has been constantly conducted into SLAM techniques applicable to various devices for improving the speed of SLAM processes such that the speed of updating a map of a virtual space may correspond to the speed of movement of a user wearing a wearable device.

SUMMARY

One or more example embodiments provide a method of accelerating calculations for simultaneous localization and mapping (SLAM) and an accelerator using the method.

According to an aspect of an example embodiment, there is provided an accelerator provided in an electronic device and configured to perform simultaneous localization and mapping (SLAM), the accelerator including a factor graph database, a memory, and a back-end processor, wherein the back-end processor is configured to receive a first piece of data corresponding to map points and camera positions from the factor graph database, convert the received first piece of data into a matrix for the map points and a matrix for the camera positions, store, in the memory, results obtained by performing an optimization calculation on the matrix for the map points and a matrix for at least one camera position, among the camera positions, corresponding to the map points, and obtain a second piece of data optimized with respect to the first piece of data based on the results stored in the memory.

The back-end processor may be further configured to divide the matrix for the map points and the matrix for the at least one camera position corresponding to the map points into a plurality of sub-tracks.

The plurality of sub-tracks may have a track length which is set based on a number of camera positions on which the back-end processor is configured to simultaneously perform calculations.

The back-end processor may be further configured to perform an optimization calculation on matrices corresponding to the plurality of sub-tracks based on a shift register.

The back-end processor may be further configured to store, in the memory, a first result obtained by performing an optimization calculation on a matrix for a first map point corresponding to a first sub-track of the plurality of sub-tracks, and on a matrix for at least one camera position corresponding to the first map point, and obtain a second result by performing an optimization calculation on a matrix for a second map point corresponding to a second sub-track following the first sub-track in the plurality of sub-tracks, and on a matrix for at least one camera position corresponding to the second map point.

The back-end processor may be further configured to store the obtained second result in the memory in which the first result is stored.

Based on obtaining the second result, the back-end processor may be further configured to reuse a matrix corresponding to at least a portion of the second sub-track, the portion corresponding to the first sub-track.

Based on performing the optimization calculation, the back-end processor may be further configured to perform a matrix calculation and a vector calculation in parallel.

According to another aspect of an example embodiment, there is provided a method of performing simultaneous localization and mapping (SLAM) by an accelerator provided in an electronic device, the method including receiving a first piece of data corresponding to map points and camera positions from a factor graph database, converting the received first piece of data into a matrix for the map points and a matrix for the camera positions, storing, in a memory, results obtained by performing an optimization calculation on the matrix for the map points and a matrix for at least one camera position, among the camera positions, corresponding to the map points, and obtaining a second piece of data optimized with respect to the first piece of data based on the results stored in the memory.

The method may further include dividing the matrix for the map points and the matrix for the at least one camera position corresponding to the map points into a plurality of sub-tracks.

The plurality of sub-tracks may have a track length which is set based on a number camera positions simultaneously calculated.

The method may further include performing an optimization calculation on matrices corresponding to the plurality of sub-tracks based on a shift register.

The method may further include storing, in the memory, a first result obtained by performing an optimization calculation on a matrix for a first map point corresponding to a first sub-track of the plurality of sub-tracks, and on a matrix for a camera position corresponding to the first map point, and obtaining a second result by performing an optimization calculation on a matrix for a second map point corresponding to a second sub-track following the first sub-track in the plurality of sub-tracks, and on a matrix for a camera position corresponding to the second map point.

The method may further include storing the obtained second result in the memory in which the first result is stored.

Based on obtaining the second result, the method may further include reusing a matrix corresponding to at least a portion of the second sub-track, the portion corresponding to the first sub-track.

According to another aspect of an example embodiment, there is provided an electronic device including a sensor, a memory, and a processor configured to control the sensor and the memory, wherein the processor is configured to perform a key point extraction calculation and a coordinate calculation on sensing data received from the sensor, and transmit results of the key point extraction calculation and the coordinate calculation to a factor graph database, obtain a first piece of data corresponding to map points and camera positions from the factor graph database, convert the obtained first piece of data into a matrix for the map points and a matrix for the camera positions, store, in the memory, results obtained by performing an optimization calculation on the matrix for the map points and a matrix for at least one camera position, among the camera positions, corresponding to the map points, and obtain a second piece of data optimized with respect to the first piece of data based on the results stored in the memory.

The processor may be further configured to divide the matrix for the map points and the matrix for the at least one camera position corresponding to the map points into a plurality of sub-tracks.

The processor may be further configured to perform an optimization calculation on matrices corresponding to the plurality of sub-tracks based on a shift register.

The processor may be further configured to store, in the memory, a first result obtained by performing an optimization calculation on a matrix for a first map point corresponding to a first sub-track of the plurality of sub-tracks, and on a matrix for a camera position corresponding to the first map point, and obtain a second result by performing an optimization calculation on a matrix for a second map point corresponding to a second sub-track following the first sub-track in the plurality of sub-tracks, and on a matrix for a camera position corresponding to the second map point.

Based on obtaining the second result, the processor may be further configured to reuse a matrix in at least a portion of the second sub-track, the portion corresponding to the first sub-track.

According to another aspect of an example embodiment, there is provided an accelerator provided in an electronic device and configured to perform simultaneous localization and mapping (SLAM), the accelerator including a factor graph database, a memory, and a back-end processor configured to receive a first piece of data corresponding to map points and camera positions from the factor graph database, convert the received first piece of data into a matrix for the map points and a matrix for the camera positions, store, in the memory, results obtained by performing an optimization calculation on the matrix for the map points and a matrix for at least one camera position, among the camera positions, corresponding to the map points, divide the matrix for the map points and the matrix for the at least one camera position corresponding to the map points into a plurality of sub-tracks, the plurality of sub-tracks having a track length set based on a number of camera positions on which the back-end processor is configured to simultaneously perform calculations, perform an optimization calculation on matrices corresponding to the plurality of sub-tracks based on a shift register, and obtain a second piece of data optimized with respect to the first piece of data based on the results stored in the memory.

BRIEF DESCRIPTION OF THE DRAWINGS

The above and/or other aspects, features, and advantages of example embodiments of the disclosure will be more apparent from the following description taken in conjunction with the accompanying drawings, in which.

DETAILED DESCRIPTION

Figure 1A:
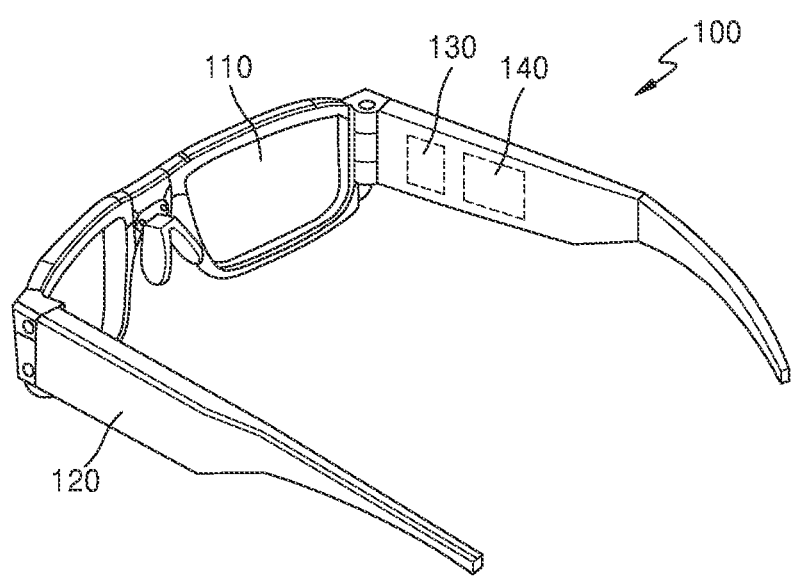
FIG. 1A is a perspective view illustrating a wearable electronic device according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms used in example embodiments are selected based on general terms currently widely used in the art, but the terms may vary according to the intention of those of ordinary skill in the art, precedents, or new technology in the art. Also, some terms may be arbitrarily selected by the applicants, and in this case, the meaning of the selected terms are described in the detailed description of the present disclosure. Thus, the terms used herein should not be construed based on only the names of the terms but should be construed based on the meaning of the terms together with the description throughout the present disclosure.

In the following descriptions of the example embodiments, expressions or terms such as "constituted by," "formed by," "include," "comprise," "including," and "comprising" should not be construed as always including all specified elements, processes, or operations, but may be construed as not including some of the specified elements, processes, or operations, or further including other elements, processes, or operations.

In the example embodiments, when a portion or element is referred to as being connected to another portion or element, the portion or element may be directly connected to the other portion or element, or may be electrically connected to the other portion or element with intervening portions or elements being therebetween.

Furthermore, in the example embodiments, terms such as "first" and "second" may be used to describe various elements, these elements should not be limited by these terms. These terms are only used to distinguish one element from other elements.

Example embodiments will now be described with reference to the accompanying drawings. However, the idea of the present disclosure may be implemented in various ways and is not limited to the example embodiments described herein.

FIG. 1A is a perspective view illustrating a wearable electronic device 100 according to an example embodiment.

Referring to FIG. 1A, the wearable electronic device 100 may include a lens 110, a connector 120 for attachment to a part of the body (for example, the head), and a sensor.

In an example embodiment, the connector 120 of the wearable electronic device 100 may include a projector, an accelerator 130, and a processor 140.

In an example embodiment, the projector may receive data from an external device and may emit a beam including the received data toward the lens 110. For example, the projector may emit a beam including data, and the emitted beam may be refracted by an object, for example, a prism, having an arbitrary refractive index and may then be displayed on the lens 110.

In an example embodiment, the processor 140 may receive sensing data with respect to the surrounding environment from the sensor. For example, the sensor may include at least one of a camera and an inertial measurement unit (IMU). In an example embodiment, the processor 140 may acquire image data with respect to the surrounding environment through the camera. The processor 140 may obtain, through the IMU, data about the position and orientation of the wearable electronic device 100 in the surrounding environment.

In an example embodiment, the processor 140 may perform a key point extraction calculation and a spatial coordinate calculation on the sensing data received from the sensor and may transmit results of the key point extraction calculation and the spatial coordinate calculation to the accelerator 130. For example, the processor 140 may extract, based on a key point extraction algorithm, at least one key point from image data acquired through the camera. The processor 140 may calculate the spatial coordinates of the wearable electronic device 100 from data about the position and orientation of the range imaging device 10 which are acquired from the IMU.

FIG. 1A illustrates that the accelerator 130 and the processor 140 are arranged on the connector 120 of the wearable electronic device 100, but the positions of the accelerator 130 and the processor 140 are not limited thereto. For example, the accelerator 130 and the processor 140 may be arranged on the front side of the wearable electronic device 100. In this case, the accelerator 130 and the processor 140 may be arranged in an edge area around the lens 110.

Although FIG. 1A illustrates that the accelerator 130 and the processor 140 are spaced apart from each other, the accelerator 130 may be embedded in the processor 140. In another example embodiment, the processor 140 in which the accelerator 130 is embedded, a memory, and the sensor may be integrally formed. In this example, the size and weight of the wearable electronic device 100 may be reduced such that the wearable electronic device 100 may be more comfortable to wear and may consume less power.

Figure 1B:
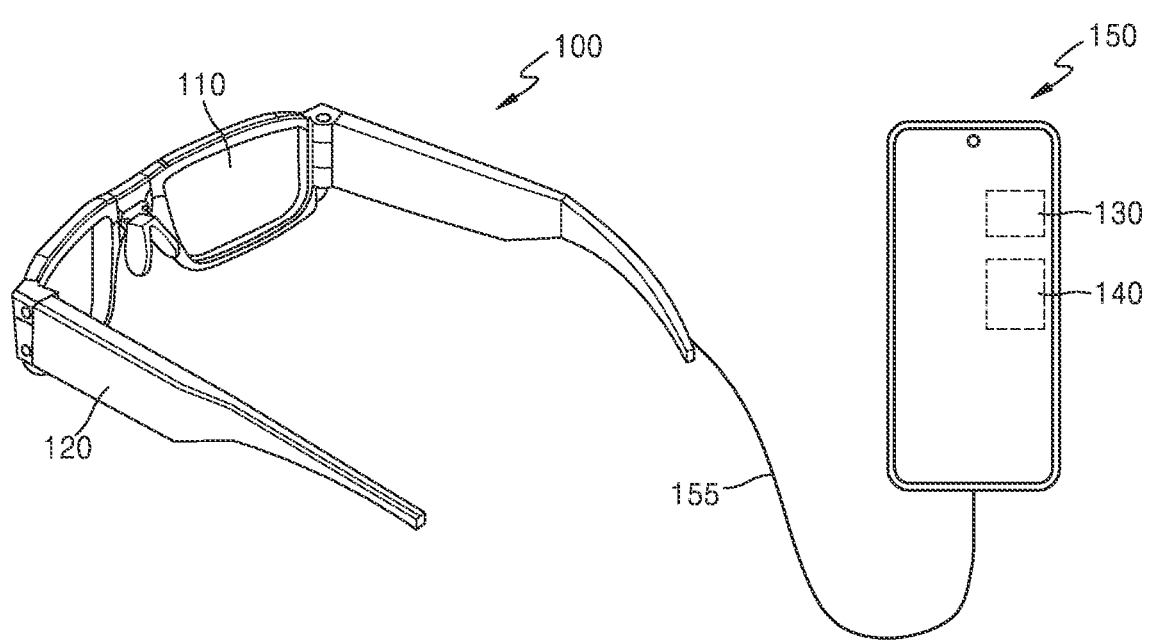
FIG. 1B is a perspective view illustrating a wearable electronic device according to another example embodiment.

FIG. 1B is a perspective view illustrating a wearable electronic device 100 according to another example embodiment. In the description of FIG. 1B, elements which correspond to or are the same as or similar to those described with reference to FIG. 1A may not be described.

Referring to FIG. 1B, the wearable electronic device 100 may include a lens 110, a connector 120 for attachment to a part of the body (for example, the head), and a sensor.

In an example embodiment, the wearable electronic device 100 may be connected to an external device 150, for example, a smartphone, through an interface 155 by wire. The external device 150 may include an accelerator 130 and a processor 140.

In an example embodiment, the wearable electronic device 100 may transmit sensing data, which is received from the sensor, to the external device 150 through the interface 155. The processor 140 of the external device 150 may perform a key point extraction calculation and a spatial coordinate calculation on the sensing data received from the wearable electronic device 100 and may transmit results of the key point extraction calculation and the spatial coordi- In an example embodiment, the wearable electronic device 100 may receive data, which is acquired by the accelerator 130, from the external device 150 through the interface 155.

Figure 2:
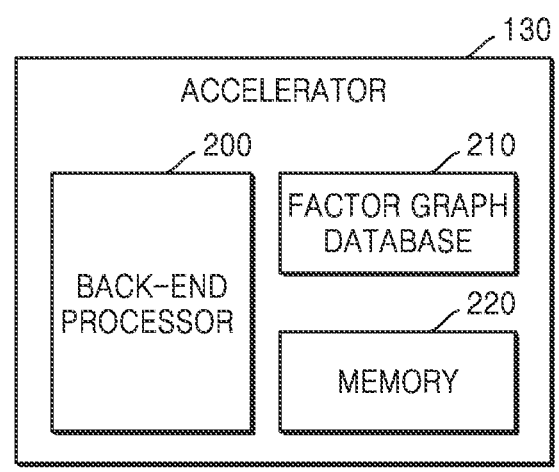
FIG. 2 is a block diagram illustrating an accelerator according to an example embodiment.

FIG. 2 is a block diagram illustrating an accelerator 130 according to an example embodiment.

Referring to FIG. 2, the accelerator 130 may include a back-end processor 200, a factor graph database 210, and a memory 220.

In an example embodiment, the back-end processor 200 may perform a calculation for optimizing simultaneous localization and mapping (SLAM). For example, the back-end processor 200 may perform a calculation on results of movements accumulated by sensor fusion in a front-end processor. The back-end processor 200 may receive data from the front-end processor, for example, the processor 140 shown in FIG. 1A or 1B, to perform repetitive calculations. For example, the back-end processor 200 may perform calculations using matrices and/or vectors to estimate the location of an electronic device, for example, the wearable electronic device 100 shown in FIG. 1A or 1B, and prepare a map.

In an example embodiment, the back-end processor 200 may estimate the location of the electronic device 100 on the prepared map. For example, while the electronic device 100 is moving, the back-end processor 200 may estimate the location of the electronic device 100 on the prepared map based on repetitive calculations. The back-end processor 200 may estimate the location of the electronic device 100 in real time, and data related to the estimated location may be updated in real time.

In an example embodiment, the factor graph database 210 may store data received from the front-end processor. For example, the front-end processor may receive sensing data from a sensor and may perform a key point extraction calculation and a spatial coordinate calculation on the sensing data. The factor graph database 210 may receive extracted key points and calculated spatial coordinates from the front-end processor and may store the key points and the spatial coordinates.

In an example embodiment, the memory 220 may accumulate and store resultant values calculated by the back-end processor 200. For example, the memory 220 may include a matrix accumulator memory and a vector accumulator memory.

Figure 3:
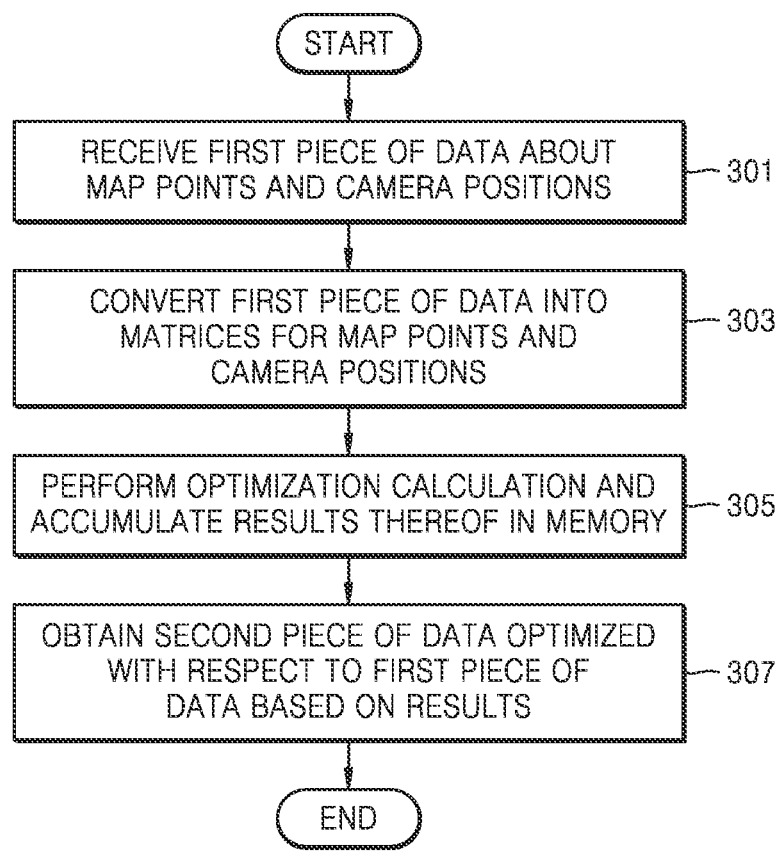
FIG. 3 is a flowchart illustrating optimization of data in an accelerator according to an example embodiment.
Figure 4:
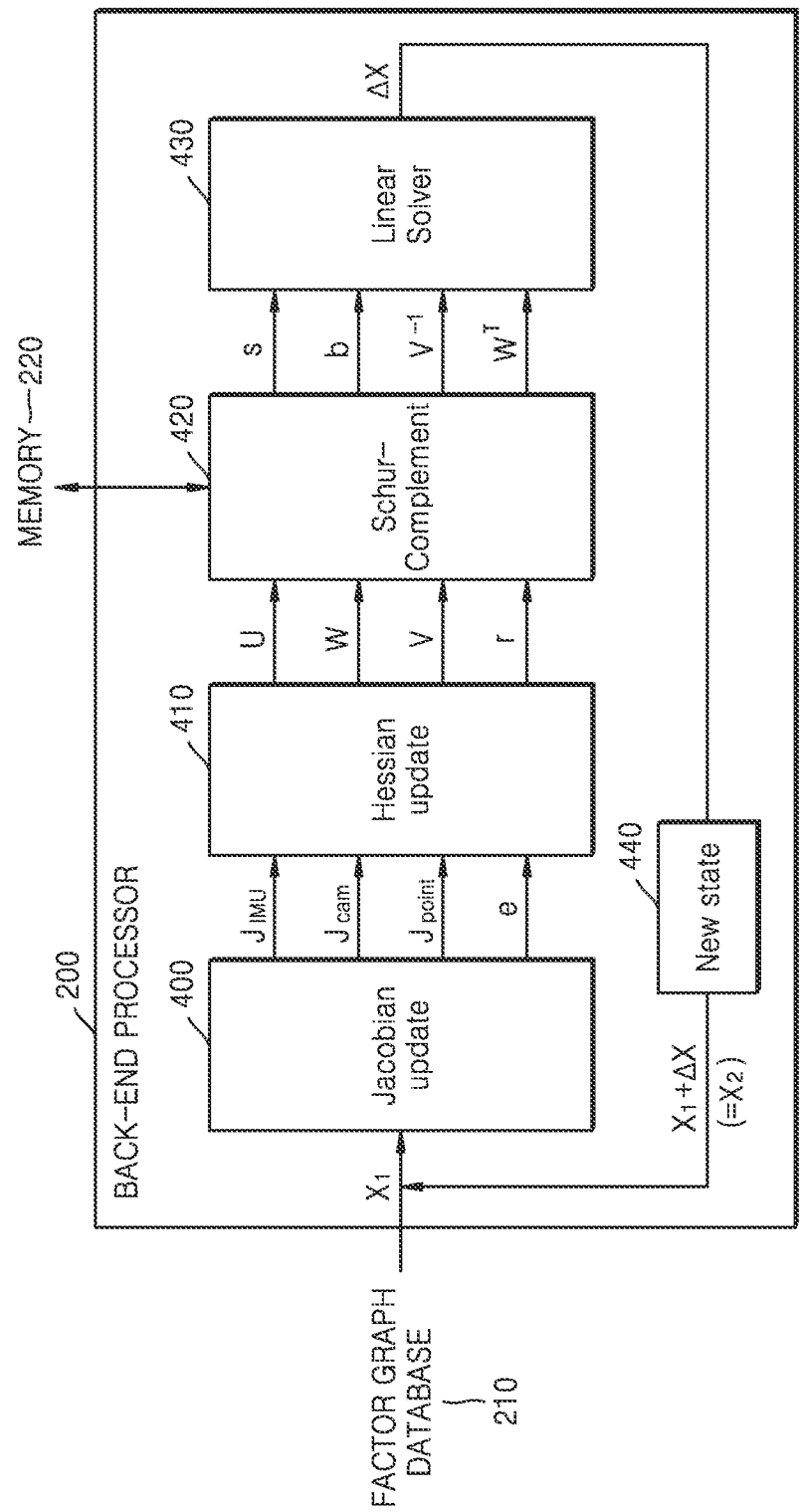
FIG. 4 is a view illustrating conversion of data into matrices for optimizing the data in an accelerator according to an example embodiment.

FIG. 3 is a flowchart illustrating optimization of data in an accelerator according to an example embodiment. FIG. 4 is a view illustrating conversion of data into matrices for optimizing data in the accelerator according to an example embodiment.

Referring to FIG. 3, in operation 301, a back-end processor, for example, the back-end processor 200 shown in FIG. 2, may receive a first piece of data $X_1$ about map points and camera positions from a factor graph database, for example, the factor graph database 210 configured to store data shown in FIG. 2. For example, the first piece of data $X_1$, which is received from the factor graph database 210, may include a map point state $X_{P1}$ and a camera position state $X_{C1}$.

According to an example embodiment, in operation 303, the back-end processor 200 may convert the first piece of data into matrices for map points and camera positions. For example, the back-end processor 200 may obtain matrices for map points and camera positions by converting the first piece of data into a Hessian matrix.

In an example embodiment, as shown in FIG. 4, the back-end processor 200 may obtain the Hessian matrix by performing a Jacobian update 400 and a Hessian update 410 on the first piece of data. In an example embodiment, the back-end processor 200 may obtain a Jacobian matrix for the first piece of data by performing the Jacobian update 400 on the first piece of data. For example, the back-end processor 200 may perform the Jacobian update 400 on a map point $X_{P1}$ and a camera position $X_{C1}$ to obtain a Jacobian matrix $I_{IMU}$ for an IMU, and a Jacobian matrix $I_{cam}$ for a camera, a Jacobian matrix $I_{point}$ for map points, and a vector (e) for errors. In an example embodiment, the back-end processor 200 may obtain Hessian matrices for the first piece of data by performing the Hessian update 410 on the Jacobian matrices obtained through the Jacobian update 400. For example, the back-end processor 200 may obtain Hessian matrices by performing the Hessian update 410 on the Jacobian matrices $I_{IMU}$, $J_{cam}$, $J_{point}$, and (e) obtained through the Jacobian update 400. As shown in Equation 1, a Hessian matrix H may include a matrix U block, a matrix W block, and a matrix V block.

$$\text{Hessian matrix } (H) = \begin{bmatrix} \text{matrix } U & \text{matrix } W \\ \text{matrix } W^T & \text{matrix } V \end{bmatrix} \quad \text{[Equation 1]}$$

The back-end processor 200 obtains the Hessian matrix H through the Jacobian update 400 and the Hessian update 410 to more easily calculate a state change $\Delta X$ and errors generated by the state change. A Hessian matrix for calculating state changes at a time point k and a time point k+1 and errors generated by the state changes may be obtained by Equations 2 to 4 below.

$$\Delta X = (J_0^T(X_k)J_e(X_k))^{-1}J_0^T(X_k)e(X_k) \quad \text{[Equation 2]}$$

$$(J_0^T(X_k)J_e(X_k))\Delta X = J_0^T(X_k)e(X_k) \quad \text{[Equation 3]}$$

$$H(X_k)\Delta X = r(X_k) \quad \text{[Equation 4]}$$

That is, through Equations 2 to 4, the back-end processor 200 may obtain a Hessian matrix $H(X_k)$ corresponding to the product of a Jacobian matrix $J_e(X_k)$ and a Jacobian transposed matrix $J_e^T(X_k)$.

In an example embodiment, the back-end processor 200 may obtain matrices for map points and camera positions through a Hessian matrix $H(X_k)$ obtained by Equations 2 to 4. For example, the back-end processor 200 may obtain a matrix U for camera positions, a matrix V for map points, and a matrix W for camera positions corresponding to the map points.

According to an example embodiment, in operation 305, the back-end processor 200 may perform an optimization calculation and may accumulate and store results of the optimization calculation in a memory, for example, the memory 220 shown in FIG. 2. The optimization calculation may refer to a Schur-complement calculation. For example, the back-end processor 200 may obtain a state change $\Delta X$ as optimization of accumulated errors by performing a calculation using a Schur-complement calculator 420 and an equation calculation using a linear solver 430 according to Equations 5 to 9 below with respect to the matrix U, the matrix V, the matrix W, and a vector (r) which are obtained in operation 303. The state change $\Delta X$ may include a camera-position state change $\Delta X_c$ and a map-point state change $\Delta X_p$.

$$\begin{bmatrix} \text{matrix } U & \text{matrix } W \\ \text{matrix } W^T & \text{matrix } V \end{bmatrix} \begin{bmatrix} \Delta X_c \\ \Delta X_p \end{bmatrix} = \begin{bmatrix} r_c \\ r_p \end{bmatrix} \quad \text{[Equation 5]}$$

$$S\Delta X_c = b \quad \text{[Equation 6]}$$

$$S = U - WV^{-1}W^T \quad \text{[Equation 7]}$$

$$b = r_c - WV^{-1}r_p \quad \text{[Equation 8]}$$

$$\Delta X_p = V^{-1}(r_p - W^T\Delta X_c) \quad \text{[Equation 9]}$$

In an example embodiment, the back-end processor 200 may first obtain the camera-position state change $\Delta X_c$ by calculating values of a matrix S and a vector b through Equations 7 and 8 and calculating, using the linear solver 430, an equation for the matrix and the vector b. Thereafter, the back-end processor 200 may obtain the map-point state change $\Delta X_p$ by back substitution using the linear solver 430.

In an example embodiment, the back-end processor 200 may sequentially perform a Schur-complement calculation based on map points. For example, the back-end processor 200 may perform a Schur-complement calculation on a matrix for a first map point and a matrix for at least one camera position corresponding to the first map point. The back-end processor 200 may perform a calculation on the first map point and may accumulate and store results of the calculation on the first map point in the memory 220.

Thereafter, the back-end processor 200 performs a Schur-complement calculation on a matrix for a second map point following the first map point and a matrix for at least one camera position corresponding to the second map point. The back-end processor 200 sequentially performs a Schur-complement calculation based on map points and accumulates and stores results of the Schur-complement calculation based on map points in the memory 200, and thus the time necessary for loading data later may be reduced.

According to an example embodiment, in operation 307, the back-end processor 200 may obtain a second piece of data optimized with respect to the first piece of data based on the results accumulated and stored in the memory 220. For example, the back-end processor 200 may obtain the second piece of data which is a new state 440 of the first piece of data by applying, to the first piece of data, the state change $\Delta X$ obtained through the calculation by the Schur-complement calculator 420 and the equation calculation by the linear solver 430. A second piece of data $X_2$ may be obtained by respectively applying $\Delta X_p$ and $\Delta X_c$ to a map-point state $X_{P1}$ and a camera-position state $X_{C1}$ of a first piece of data $X_1$. The second piece of data $X_2$ may include a map-point state $X_{P2}$ and a camera-position state $X_{C2}$.

Figure 5:
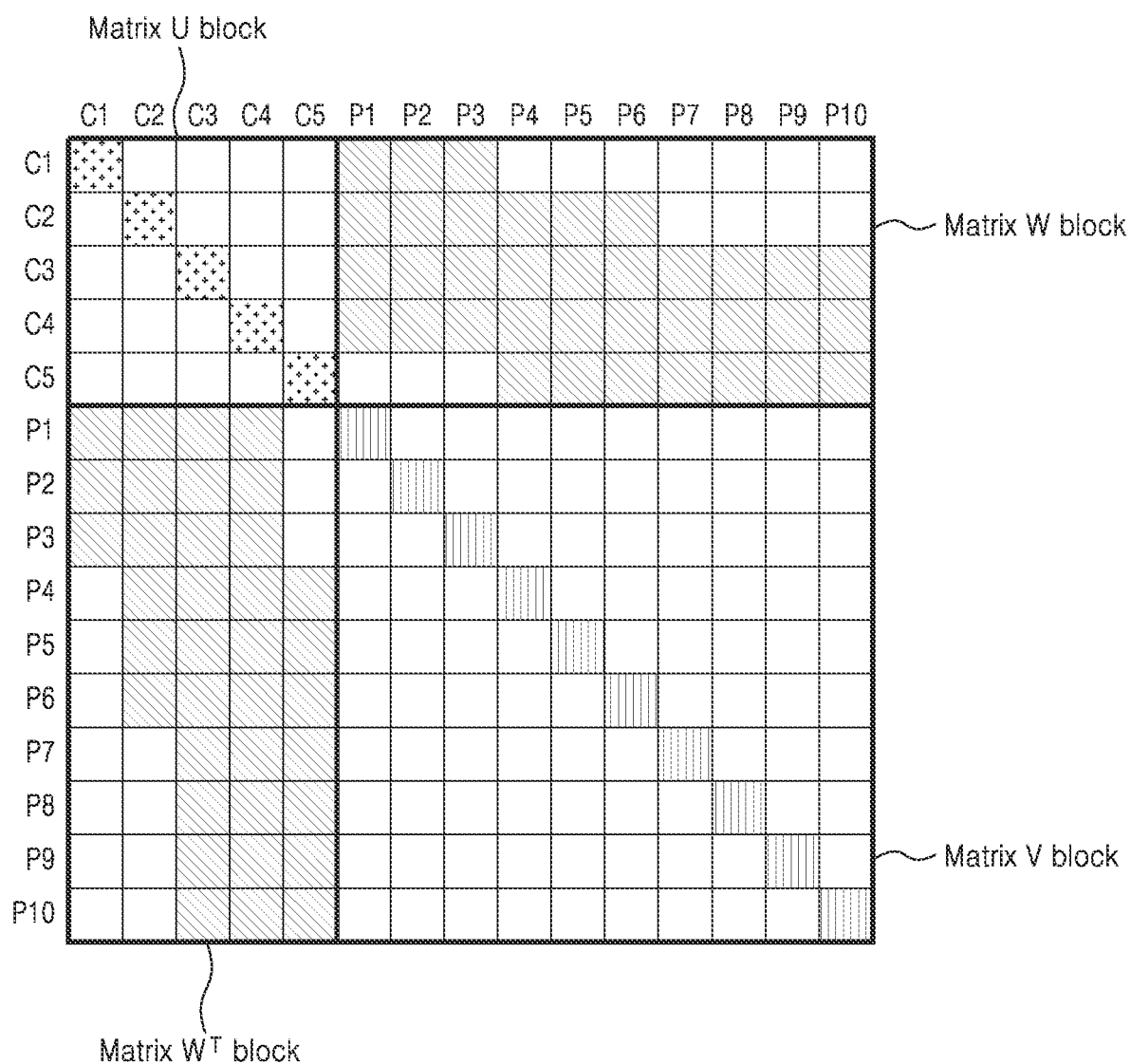
FIG. 5 is a view illustrating illustrates a Hessian matrix for performing a Schur-complement calculation in an accelerator according to an example embodiment.

FIG. 5 is a view illustrating illustrates a Hessian matrix for performing a Schur-complement calculation in an accelerator according to an example embodiment.

Referring to FIG. 5, the Hessian matrix may include a matrix U block, a matrix W block, a matrix $W^T$ block, and a matrix V block. For example, the matrix U block may correspond to a matrix block for camera positions, and the matrix V block may correspond to a matrix block for map points. The matrix W block and the matrix $W^T$ block may correspond to a matrix block for map points and a matrix block for camera positions.

In an example embodiment, the matrix W block and the matrix $W^T$ block may show a relationship between map points and camera positions. For example, a map point P1 of the matrix W block may be obtained in four frames corresponding to camera positions C1 to C4. In another example, map points P1 to P3 may be obtained in a frame corresponding to the camera position C1 of the matrix W block.

In an example embodiment, each of the matrix U block and the matrix V block may a diagonal matrix which has data only in diagonal entries and does not have data in all other entries. For example, the matrix U block for camera positions C1 to C5 may have data only in an entry at which camera positions C1 and C1 meet each other, an entry at which camera positions C2 and C2 meet each other, an entry at which camera positions C3 and C3 meet each other, an entry at which camera positions C4 and C4 meet each other, and an entry at which camera positions C5 and C5 meet each other. In addition, the matrix V block for map points P1 to P10 may have data only in an entry at which map points P1 and P1 meet each other, an entry at which map points P2 and P2 meet each other, . . . , and an entry at which map points P10 and P10 meet each other.

In an example embodiment, when the back-end processor 200 performs a Schur-complement calculation through a Hessian matrix, a matrix S may be obtained by Equation 10 below.

$$S_{i1,i2} = U_{i1,i2} - \Sigma W_{i1,j} V_j^{-1} W_{i2,j}^T \quad \text{[Equation 10]}$$

In Equation 10, i1 and i2 may refer to camera position indexes, and j may refer to a map point index. For example, in the Hessian matrix shown in FIG. 5, i1 and i2 may correspond to C1 to C5, and j may correspond to P1 to P10.

In an example embodiment, the back-end processor 200 may generate a matrix S by performing a Schur-complement calculation on map points, and the size of the matrix S may be determined based on camera position indexes with which the map points are obtained.

For example, when the back-end processor 200 generates a matrix S y performing a Schur-complement calculation on the map point P1, each of i1 and i2 for the map point P1 may correspond to C1 to C4 in the matrix S. Therefore, the matrix S may be a 4×4 matrix.

In another example, when the back-end processor 200 generates a matrix S by performing a Schur-complement calculation on the map point P7, each of i1 and i2 for the map point P7 may correspond to C3 to C5 in the matrix S. Therefore, the matrix S may be a 3×3 matrix.

Figure 6:
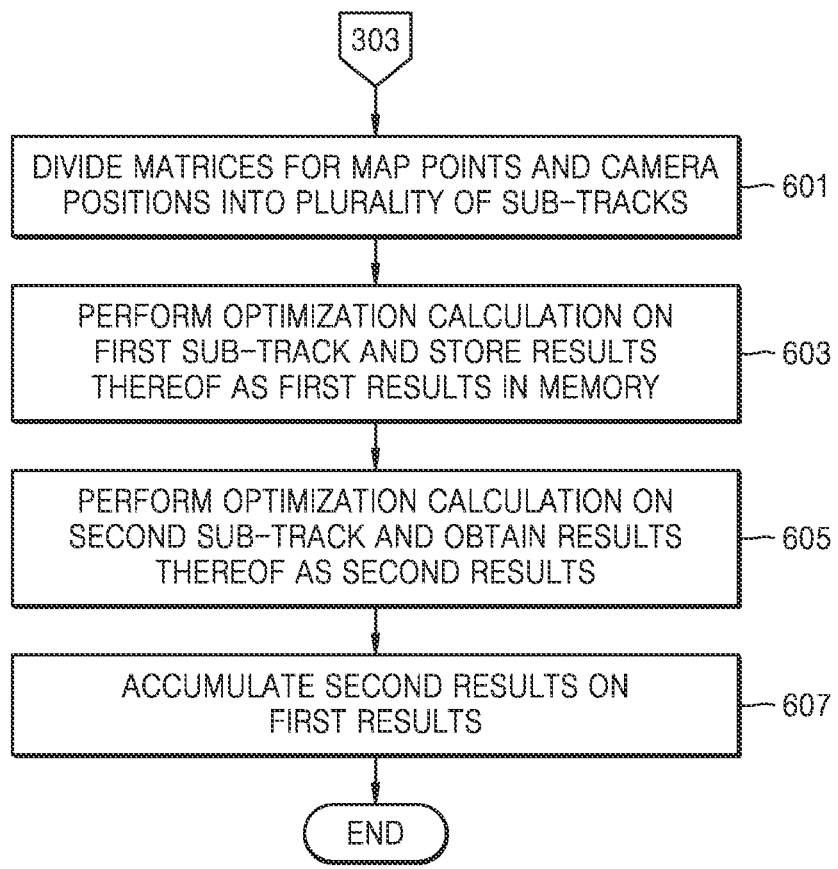
FIG. 6 is a flowchart illustrating optimization by division into a plurality of sub-tracks in an accelerator according to an example embodiment.
Figure 7:
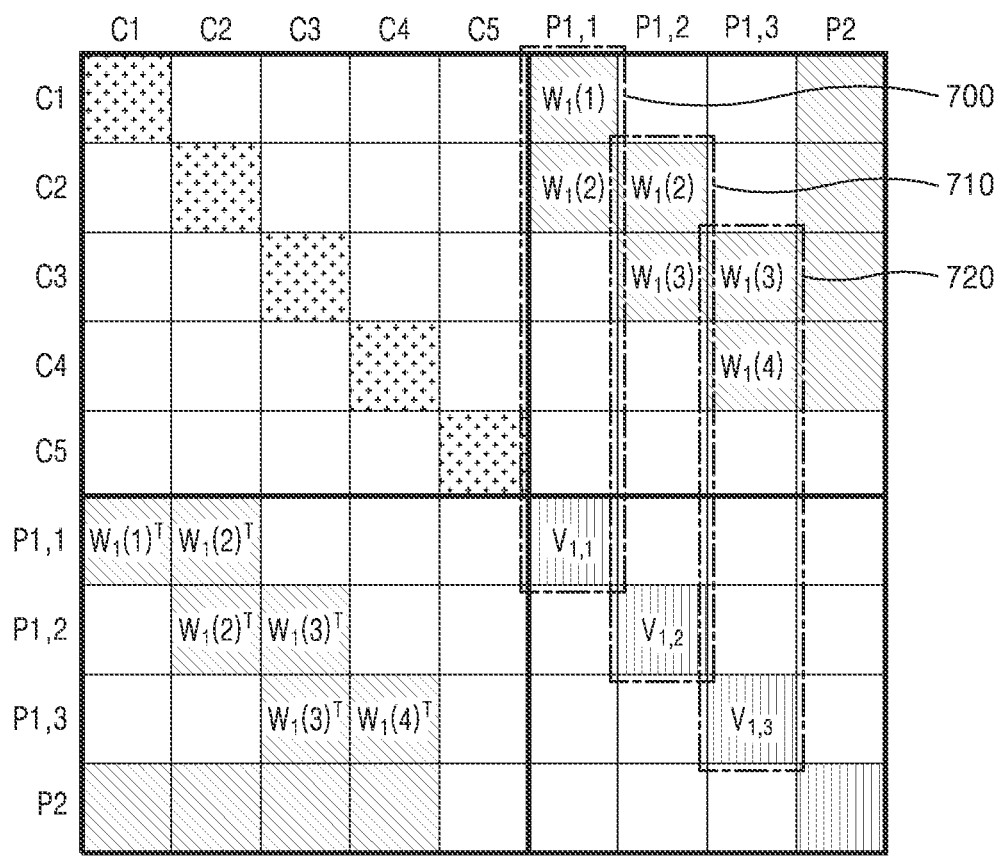
FIG. 7 is a view illustrating a Hessian matrix for performing a Schur-complement calculation by division into a plurality of sub-tracks in an accelerator according to an example embodiment.

FIG. 6 is a flowchart illustrating optimization by division into a plurality of sub-tracks in an accelerator according to an example embodiment. FIG. 7 is a view illustrating a Hessian matrix for performing a Schur-complement calculation by division into a plurality of sub-tracks in the accelerator according to an example embodiment.

Referring to FIG. 6, after a back-end processor, for example, the back-end processor 200 of FIG. 2, acquires matrices for map points and camera positions with respect to a first piece of data in operation 303 shown in FIG. 3, the back-end processor 200 may divide the matrices for map points and camera positions into a plurality of sub-tracks in operation 601.

In an example embodiment, the plurality of sub-tracks may have a track length set based on the number of camera positions on which the back-end processor 200 may simultaneously perform calculations.

For example, when the back-end processor 200 is capable of simultaneously performing calculations on only five camera positions or frames, the track length of the sub-tracks may be set to be 5 For example, when a map point, for example, a map point P1, is acquired from ten frames corresponding to camera positions C1 to C10, a matrix for the map point, for example, the "matrix V block" shown in FIG. 5, and a matrix for at least one camera position corresponding to the map point, for example, the "matrix W block" shown in FIG. 5, may be divided based on the set sub-track length. In this example, the number of sub-tracks may be determined by Equation 11 below.

$$N_{subtrack} = N_{frame} - (\text{subtrack length}) + 1 \quad \text{[Equation 11]}$$

When the sub-track length subtrack length and the number of frames $N_{frame}$ from which a specific map point is acquired is 10, the number of sub-tracks $N_{subtrack}$ may be 6 as shown in Equation 11.

According to an example embodiment, in operation 603, the back-end processor 200 may store, in a memory, first results obtained by performing an optimization calculation on a first sub-track. The optimization calculation may be a Schur-complement calculation.

For example, the back-end processor 200 may perform a Schur-complement calculation on a matrix $V_{1,1}$ for a first map point P1,1 corresponding to a first sub-track 700, and on matrices $W_1(1)$ and $W_1(2)$ for one or more camera positions C1 and C2 corresponding to the first map point P1,1.

In an example embodiment, the back-end processor 200 may obtain a matrix $S_{1,1}$ and a vector $b_{1,1}$ as first results by performing a Schur-complement calculation on the matrices $V_{1,1}$, $W_1(1)$, and $W_1(2)$. In an example embodiment, since the matrix has symmetrical entries based on the diagonal entries, the back-end processor 200 may obtain only the diagonal entries and the upper triangle entries of the matrix $S_{1,1}$ by performing a Schur-complement calculation. The back-end processor 200 may store data of the obtained matrix $S_{1,1}$ and the vector $b_{1,1}$ as first results in the memory, for example, the memory 220 shown in FIG. 2.

According to an example embodiment, in operation 605, the back-end processor 200 may obtain second results by performing an optimization calculation on a second sub-track. The optimization calculation may be a Schur-complement calculation.

For example, the back-end processor 200 may perform a Schur-complement calculation on a matrix $V_{1,2}$ for a second map point P1,2 and matrices $W_1(2)$ and $W_1(3)$ for one or more camera positions C2 and C3, wherein the matrix $V_{1,2}$ and the matrices $W_1(2)$ and $W_1(3)$ correspond to a second sub-track 710.

In an example embodiment, the back-end processor 200 may not load data on the second sub-track 710 which overlaps data on the first sub-track 700. For example, the back-end processor 200 may determine that the matrix $W_1(2)$ for the camera position C2 corresponding to the first map point in the first sub-track 700 overlaps the matrix $W_1(2)$ for the camera position C2 corresponding to the second map point in the second sub-track 710. Therefore, the back-end processor 200 may not load the matrix $W_1(2)$ for the camera position C2 but may load only the matrix $W_1(3)$ for the camera position C3, thereby reducing a data loading time.

In an example embodiment, the back-end processor 200 may obtain a matrix $S_{1,2}$ and a vector $b_{1,2}$ as second results by performing a Schur-complement calculation on the matrices $V_{1,2}$, $W_1(2)$, and $W_1(3)$.

According to an example embodiment, in operation 607, the back-end processor 200 may accumulate and store the second results in the memory, for example, the memory 220 shown in FIG. 2, in which the first results are stored. In an example embodiment, the back-end processor 200 may store and accumulate data in the memory 220 in the order in which the data is output through Schur-complement calculations. For example, the back-end processor 200 may accumulate and store the second results in the memory in which the first results are stored and may then accumulate and store third results, which are obtained in a third sub-track 720, in the memory 220 in which the first and second results are sequentially accumulated and stored.

Figure 8:
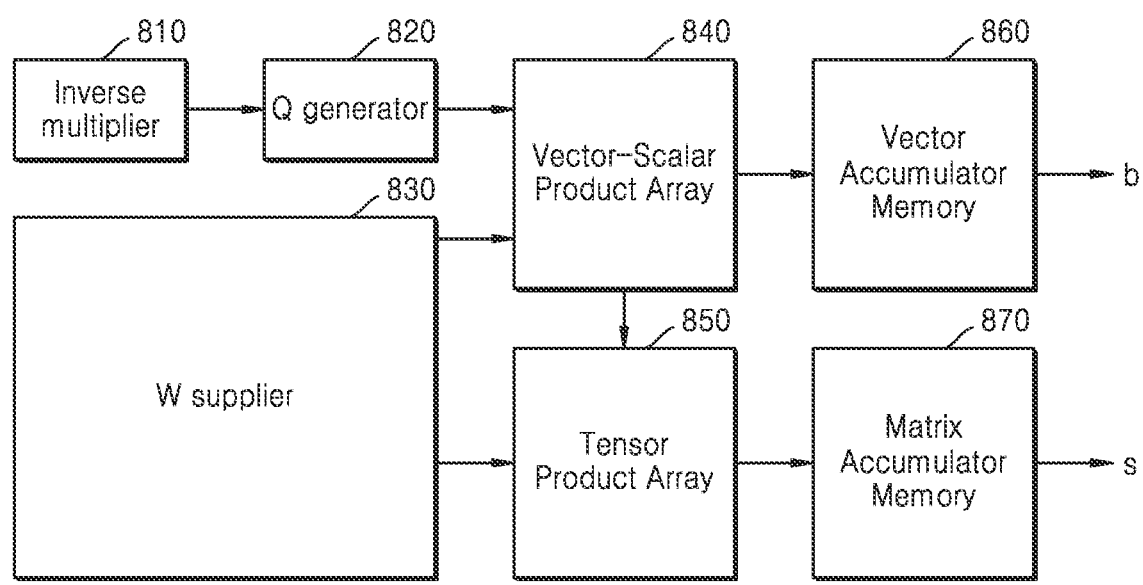
FIG. 8 is a block diagram illustrating a Schur-complement calculator according to an example embodiment.

FIG. 8 is a block diagram illustrating a Schur-complement calculator according to an example embodiment.

Referring to FIG. 8, the Schur-complement calculator, for example, the Schur-complement calculator 420 shown in FIG. 4, may include an inverse multiplier 810, a Q generator 820, and a W supplier 830, a vector-scalar product array 840, a tensor product array 850, a vector accumulator memory 860, and a matrix accumulator memory 870. In an example embodiment, the vector accumulator memory 860 and the matrix accumulator memory 870 may correspond to the memory 220 shown in FIG. 2.

In an example embodiment, the Schur-complement calculator 420 may calculate a matrix S and a vector b as shown in Equation 12 below. Equation 12 may correspond to a pseudo-code for performing a Schur-complement calculation on a matrix divided into a plurality of sub-tracks, for example, five sub-tracks, as in operations 603 and 605 shown in FIG. 6.

$$\text{for}(j=0; j<N_{subtracked_{keypoint}}; j++)$$

$$\text{for}(j=C_{si}; i<C_{sf}+\text{track length}; i++)$$

$$S(i,i+0) += W_j(i)Q_j(i-4,i)W_j(i+0)^T$$

$$S(i,i+1) += W_j(i)Q_j(i-3,i)W_j(i+1)^T$$

$$S(i,i+2) += W_j(i)Q_j(i-2,i)W_j(i+2)^T$$

$$S(i,i+3) += W_j(i)Q_j(i-1,i)W_j(i+3)^T$$

$$S(i,i+4) += W_j(i)Q_j(i-0,i)W_j(i+4)^T$$

$$b(i) += W_j(i)\Sigma_{k=i-4}^{i} V_{jk}^{-1}(i)r_p \quad \text{[Equation 12]}$$

In Equation 12, i may refer to a camera position index, and j may refer to a map point index.

In an example embodiment, the inverse multiplier 810 may receive V data and r data obtained through a Hessian update, for example, the Hessian update 410 shown in FIG. 4. For example, the V data may refer to a matrix V block for map points in a Hessian matrix $H(X_k)$. The r data may refer to a vector corresponding to the product of the Hessian matrix $H(X_k)$ and a state change $\Delta X$. The r data may refer to a vector corresponding to the product of a Jacobian transposed matrix $J_e^T(X_k)$ and an error vector $e(X_k)$. In an example embodiment, the inverse multiplier 810 may calculate the inverse matrix $V^{-1}$ of the V data, and the product $(V^{-1}r)$ of the inverse matrix $V^{-1}$ of the V data and the r data.

In an example embodiment, the Q generator 820 may receive the product $(V^{-1}r)$ of the inverse matrix $V^{-1}$ of the V data and the r data from the inverse multiplier 810 to produce a vector q and a matrix $Q_j(a,b)$. In an embodiment, the Q generator 820 may generate the matrix $Q_j(a,b)$ and the vector q through Equations 13 and 14 below.

$$Q_j(a,b) = \Sigma_{k=a}^{b} V_{jk}^{-1} \quad \text{[Equation 13]}$$

$$q = \Sigma_{k=i-4}^{i} V_{jk}^{-1} r_p \quad \text{[Equation 14]}$$

In an example embodiment, the W supplier 830 may receive W data obtained through the Hessian update 410. For example, the W data may refer to a matrix W block for camera positions corresponding to map points in the Hessian matrix $H(X_k)$.

In an example embodiment, the vector-scalar product array 840 may multiply the vector q and the matrix $Q_j(a,b)$ received from the Q generator 820 by the W data received from the W supplier 830. In an example embodiment, the tensor product array 850 may perform a tensor product calculation on the W data received from the W supplier 830 and the multiplication data received from the vector-scalar product array 840. In this case, the tensor product array 850 may perform the tensor product calculation after converting the W data received from the W supplier 830 into a transposed matrix by exchanging row values and column values with each other based on diagonal entries.

In an example embodiment, the vector-scalar product array 840 may transmit the product of the vector q and the W data to the vector accumulator memory 860. In an example embodiment, the tensor product array 850 may transmit, to the matrix accumulator memory 870, the tensor product of the W data and the multiplication data received from the vector-scalar product array 840.

Figure 9:
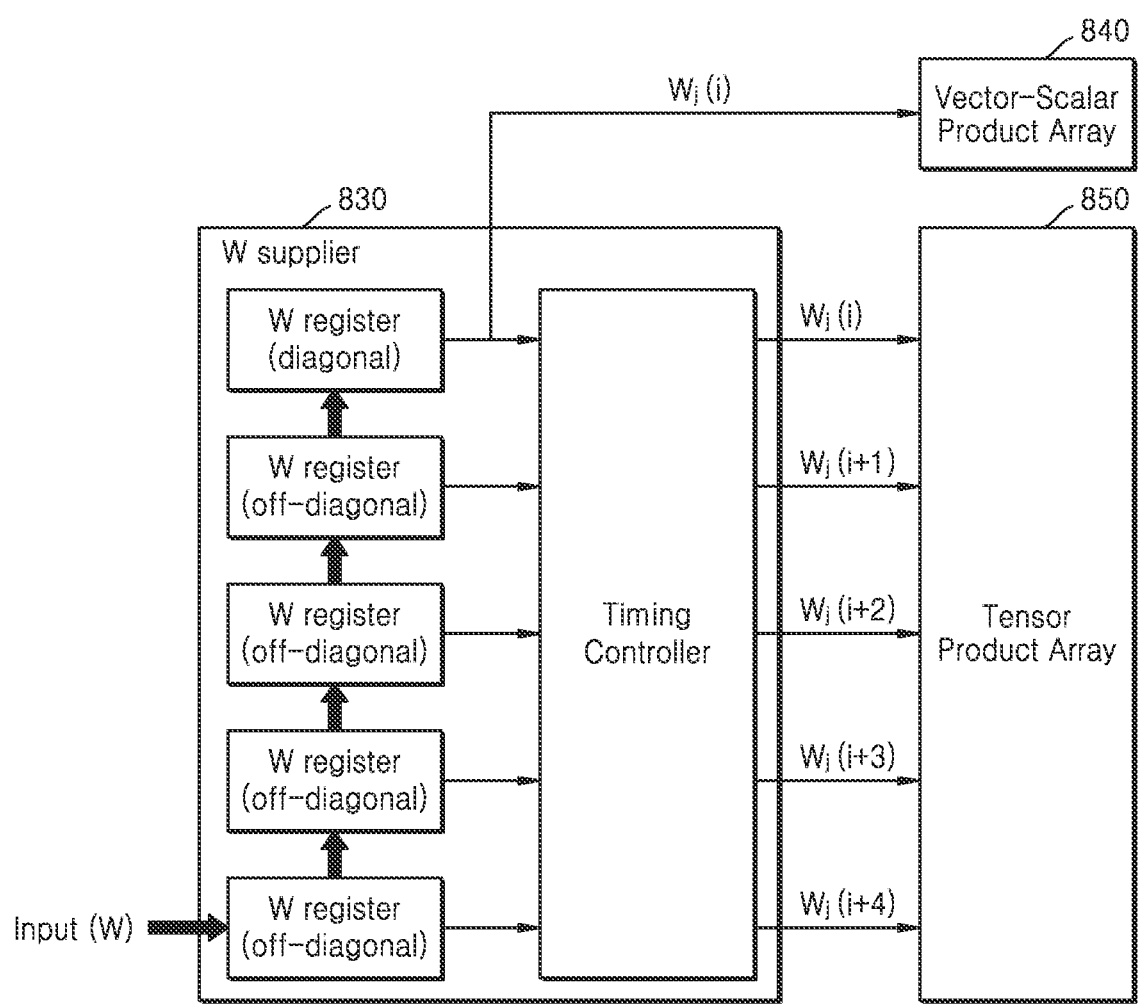
FIG. 9 is a block diagram illustrating a W supplier of a Schur-complement calculator according to an example embodiment.

FIG. 9 is a block diagram illustrating a W supplier 830 of a Schur-complement calculator according to an example embodiment.

Referring to FIG. 9, the W supplier 830 of the Schur-complement calculator, for example, the Schur-complement calculator 420 shown in FIG. 4, may receive, as an input, W data obtained by a Hessian update, for example, the Hessian update 410 shown in FIG. 4.

In an example embodiment, the W supplier 830 may include a plurality of W registers corresponding to division into a plurality of sub-tracks. For example, when the W data is divided into five sub-tracks, the W supplier 830 may include five W registers. In this case, the W registers may include a W register including diagonal entries of the W data and a plurality of W registers including off-diagonal entries of the W data.

In an example embodiment, the W supplier 830 may include a plurality of shift registers. For example, the W supplier 830 may sequentially move the received W data through the shift registers. In an example embodiment, the number of shift registers may be the same as the number of sub-tracks.

In an example embodiment, the W supplier 830 may include a timing controller (T-CON) that transmits data processed through the shift registers to the tensor product array 850. For example, data processed by the shift registers may be sequentially input to the timing controller, and the timing controller may simultaneously transmit the received pieces of data, for example, $W_j(i)$, $W_j(i+1)$, $W_j(i+2)$, $W_j(i+3)$ and $W_j(i+4)$, to the tensor product array 850.

In an example embodiment, the W supplier 830 may transmit data processed through the shift registers to the vector-scalar product array 840. For example, the W supplier 830 may transmit, to the vector-scalar product array 840, data, for example, $W_j(i)$, processed by the W register including diagonal entries of the W data.

Figure 10:
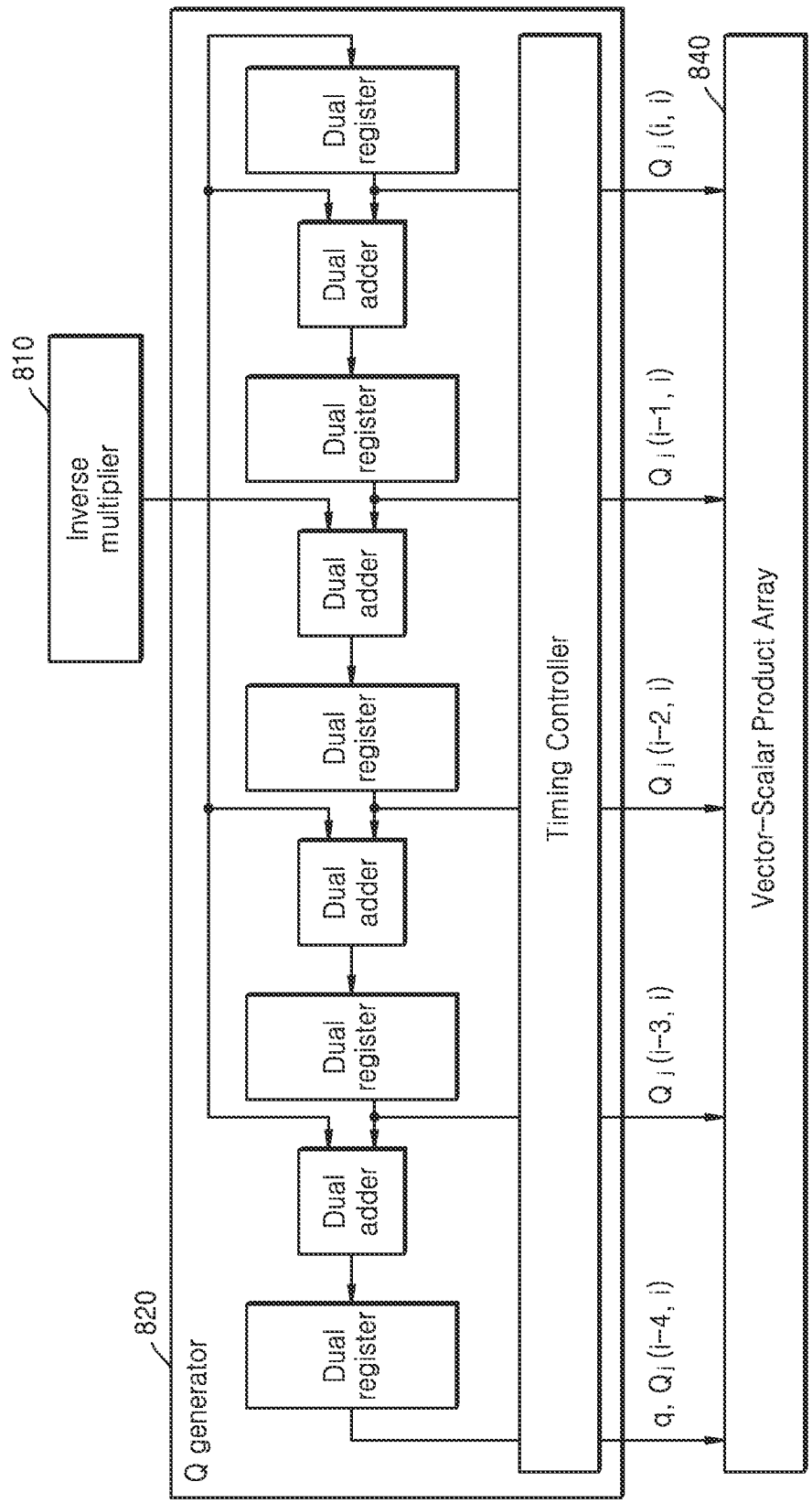
FIG. 10 is a block diagram illustrating a Q generator of a Schur-complement calculator according to an example embodiment.

FIG. 10 is a block diagram illustrating a Q generator 820 of a Schur-complement calculator according to an example embodiment.

Referring to FIG. 10, the Q generator 820 of the Schur-complement calculator, for example, the Schur-complement calculator 420 shown in FIG. 4, may generate a vector q and a matrix $Q_j(a,b)$ by receiving the inverse matrix $V^{-1}$ of V data and the product $(V^{-1}r)$ of r data and the inverse matrix $V^{-1}$.

In an example embodiment, the Q generator 820 may include a plurality of dual registers and a plurality of dual adders which correspond to division into a plurality of sub-tracks. For example, the dual registers and the dual adders may correspond to shift registers. The Q generator 820 may sequentially move the inverse matrix $V^{-1}$ of the V data and the product $(V^{-1}r)$ of the inverse matrix $V^{-1}$ and the r data through the dual registers and the dual adders. In an example embodiment, the number of dual registers may be equal to the number of sub-tracks.

In an example embodiment, the Q generator 820 may include a timing controller (T-CON) that transmits data, which is processed through the dual registers and the dual adders, to the vector-scalar product array 840. For example, data processed through the dual registers and the dual adders may be sequentially input to the timing controller, and the timing controller may simultaneously transmit the received pieces of data, for example, q, $Q_j(i-4,i)$, $Q_j(i-3,i)$, $Q_j(i-2,i)$, $Q_j(i-1,i)$ and $Q_j(i,i)$ the vector-scalar product array 840.

Figure 11:
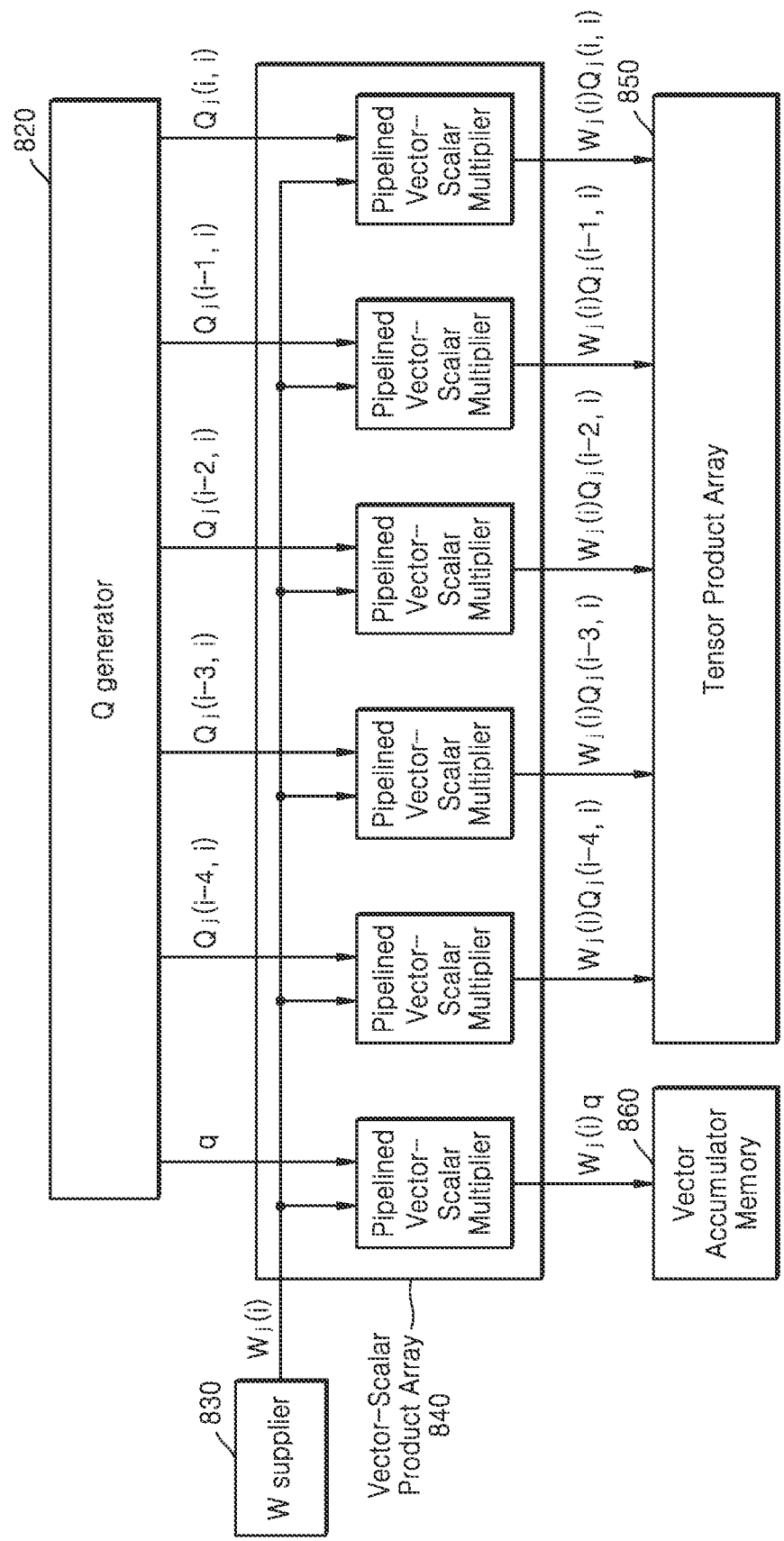
FIG. 11 is a block diagram illustrating a vector-scalar product array of a Schur-complement calculator according to an example embodiment.

FIG. 11 is a block diagram illustrating a vector-scalar product array 840 of a Schur-complement calculator according to an example embodiment.

Referring to FIG. 11, the vector-scalar product array 840 may receive diagonal entries, for example, $W_j(i)$, of W data from the W supplier 830, and a vector q and a matrix $Q_j(a,b)$ from the Q generator 820.

In an example embodiment, the vector-scalar product array 840 may perform a vector-scalar product calculation on the W data, the vector q, and the matrix $Q_j(a,b)$. In this case, the vector-scalar product array 840 may simultaneously perform a multiplication calculation on the W data and the vector q and a multiplication calculation on the W data and the matrix $Q_j(a,b)$. For example, the vector-scalar product array 840 may include a plurality of pipelined vector-scalar multipliers, and the pipelined vector-scalar multipliers may perform, in parallel, a multiplication calculation on the W data and the vector q and a multiplication calculation on the W data and the matrix $Q_j(a,b)$.

In an example embodiment, the vector-scalar product array 840 may store results, for example, $W_j(i)q$, of the multiplication of the W data and the vector q in the vector accumulator memory 860. In an embodiment, the vector-scalar product array 840 may transmit, to the tensor product array 850, results, for example, $W_j(i)Q_j(i-4,i)$, $W_j(i)Q_j(i-3,i)$, $W_j(i)Q_j(i-2,i)$, $W_j(i)Q_j(i-1,i)$, and $W_j(i)Q_j(i,i)$, of the multiplication of the W data and the matrix $Q_j(a,b)$.

Figure 12:
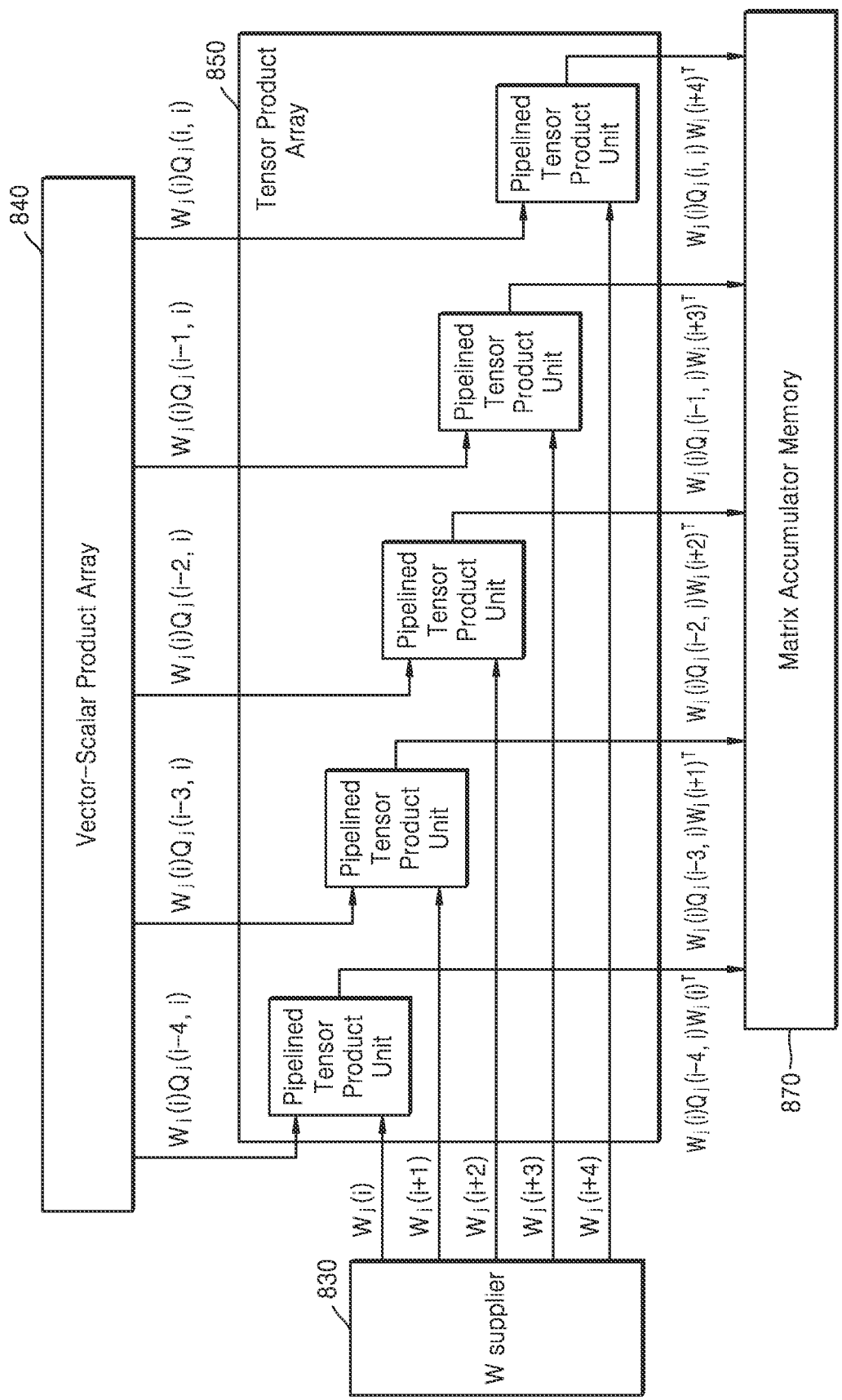
FIG. 12 is a block diagram illustrating a tensor product array of a Schur-complement calculator according to an example embodiment.

FIG. 12 is a block diagram illustrating a tensor product array 850 of a Schur-complement calculator according to an example embodiment.

Referring to FIG. 12, the tensor product array 850 may receive W data, for example, $W_j(i)$, $W_j(i+1)$, $W_j(i+2)$, $W_j(i+3)$, and $W_j(i+4)$ from the W supplier 830, and the results, for example, $W_j(i)Q_j(i-4,i)$, $W_j(i)Q_j(i-3,i)$, $W_j(i)Q_j(i-2,i)$, $W_j(i)Q_j(i-1,i)$, and $W_j(i)Q_j(i,i)$, of the multiplication of the W data and the matrix $Q_j(a,b)$ from the vector-scalar product array 840.

In an example embodiment, the tensor product array 850 may perform a tensor product calculation on the W data and the results of the multiplication of the W data and the matrix $Q_j(a,b)$. In this example, the tensor product array 850 may simultaneously perform a tensor product calculation on the W data received from the W supplier 830 and the results of the multiplication of the W data and the matrix $Q_j(a,b)$ which are received from the vector-scalar product array 840. For example, the tensor product array 850 may perform the tensor product calculation after converting the W data received from the W supplier 830 into a transposed matrix. That is, the W data converted into the transposed matrix may include $W_j(i)^T$, $W_j(i+1)^T$, $W_j(i+2)^T$, $W_j(i+3)^T$, and $W_j(i+4)^T$.

In an example embodiment, the tensor product array 850 may store, in the matrix accumulator memory 870, results, for example, $W_j(i)Q_j(i-4,i)W_j(i)^T$, $W_j(i)Q_j(i-3,i)W_j(i+1)^T$, $W_j(i)Q_j(i-2,i)W_j(i+2)^T$, $W_j(i)Q_j(i-1,i)W_j(i+3)^T$, and $W_j(i)Q_j(i,i)W_j(i+4)^T$, of the tensor product calculation.

It will be understood by those skilled in the art that various changes in form and details may be made in the example embodiments therein without departing from the spirit and scope of the present disclosure. Therefore, the example embodiments described herein should be considered in a descriptive sense only and not for purposes of limitation. The scope of the present disclosure is defined not by the above description but by the following claims, and all differences within equivalent ranges of the scope of the present disclosure should be considered as being included in the scope of the present disclosure.

As described above, according to the one or more of the above example embodiments, the method of performing SLAM and the device using the method are provided to short the time necessary for SLAM calculation by increasing the processing speed of the back-end processor.

According to the method of performing SLAM and the device using the method of the one or more of the above example embodiments, data processed based on map points are sequentially accumulated and stored in the memory, and thus the time necessary for loading data in the middle of calculation may be decreased. In addition, since calculation is performed in a divided manner by reflecting the specifications of hardware, the speed of processing may be improved even when the number of frames acquired from a sensor may be increased.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. An accelerator provided in an electronic device and configured to perform simultaneous localization and mapping (SLAM), the accelerator comprising:
   a factor graph database;
   a memory; and
   a back-end processor configured to:
      receive a first piece of data corresponding to map points and camera positions from the factor graph database;
      convert the received first piece of data into a matrix for the map points and a matrix for the camera positions;
      divide the matrix for the map points and the matrix for at least one camera position corresponding to the map points into a plurality of sub-tracks, the plurality of sub-tracks having a track length set based on a number of camera positions on which the back-end processor is configured to simultaneously perform calculations;
      store, in the memory, results obtained by performing an optimization calculation on the matrix for the map points and a matrix for at least one camera position, among the camera positions, corresponding to the map points; and
      obtain a second piece of data optimized with respect to the first piece of data based on the results stored in the memory,
   wherein the back-end processor is further configured to perform an optimization calculation on matrices corresponding to the plurality of sub-tracks based on a plurality of shift registers, the plurality of shift registers corresponding to the plurality of sub-tracks, and
   wherein pieces of data processed through the plurality of shift registers are sequentially input to a timing controller and the timing controller is configured to simultaneously transmit the pieces of data.

2. The accelerator of claim 1, wherein the back-end processor is further configured to perform an optimization calculation on matrices corresponding to the plurality of sub-tracks based on a shift register.

3. The accelerator of claim 1, wherein the back-end processor is further configured to:
   store, in the memory, a first result obtained by performing an optimization calculation on a matrix for a first map point corresponding to a first sub-track of the plurality of sub-tracks, and on a matrix for at least one camera position corresponding to the first map point; and
   obtain a second result by performing an optimization calculation on a matrix for a second map point corresponding to a second sub-track following the first sub-track in the plurality of sub-tracks, and on a matrix for at least one camera position corresponding to the second map point.

4. The accelerator of claim 3, wherein the back-end processor is further configured to store the obtained second result in the memory in which the first result is stored.

5. The accelerator of claim 3, wherein based on obtaining the second result, the back-end processor is further configured to reuse a matrix corresponding to at least a portion of the second sub-track, the portion corresponding to the first sub-track.

6. The accelerator of claim 1, wherein based on performing the optimization calculation, the back-end processor is further configured to perform a matrix calculation and a vector calculation in parallel.

7. A method of performing simultaneous localization and mapping (SLAM) by an accelerator provided in an electronic device, the method comprising:
   receiving a first piece of data corresponding to map points and camera positions from a factor graph database;
   converting the received first piece of data into a matrix for the map points and a matrix for the camera positions;
   dividing the matrix for the map points and the matrix for the at least one camera position corresponding to the map points into a plurality of sub-tracks, the plurality of sub-tracks having a track length which is set based on a number camera positions simultaneously calculated;
   storing, in a memory, results obtained by performing an optimization calculation on the matrix for the map points and a matrix for at least one camera position, among the camera positions, corresponding to the map points; and
   obtaining a second piece of data optimized with respect to the first piece of data based on the results stored in the memory,
   wherein the method further comprises performing an optimization calculation on matrices corresponding to the plurality of sub-tracks based on a plurality of shift registers, the plurality of shift registers corresponding to the plurality of sub-tracks, and
   wherein pieces of data processed through the plurality of shift registers are sequentially input to a timing controller and the timing controller is configured to simultaneously transmit the pieces of data.

8. The method of claim 7, further comprising performing an optimization calculation on matrices corresponding to the plurality of sub-tracks based on a shift register.

9. The method of claim 7, further comprising:
   storing, in the memory, a first result obtained by performing an optimization calculation on a matrix for a first map point corresponding to a first sub-track of the plurality of sub-tracks, and on a matrix for a camera position corresponding to the first map point; and obtaining a second result by performing an optimization calculation on a matrix for a second map point corresponding to a second sub-track following the first sub-track in the plurality of sub-tracks, and on a matrix for a camera position corresponding to the second map point.

10. The method of claim 9, further comprising storing the obtained second result in the memory in which the first result is stored.

11. The method of claim 9, wherein based on obtaining the second result, the method further comprises reusing a matrix corresponding to at least a portion of the second sub-track, the portion corresponding to the first sub-track.

12. An electronic device configured to perform simultaneous localization and mapping (SLAM), the electronic device comprising:
a sensor;
a factor graph database;
a memory; and a processor configured to control the sensor and the memory,
wherein the processor is further configured to:
perform a key point extraction calculation and a coordinate calculation on sensing data received from the sensor, and transmit results of the key point extraction calculation and the coordinate calculation to the factor graph database;
obtain a first piece of data corresponding to map points and camera positions from the factor graph database;
convert the obtained first piece of data into a matrix for the map points and a matrix for the camera positions;
divide the matrix for the map points and the matrix for at least one camera position corresponding to the map points into a plurality of sub-tracks, the plurality of sub-tracks having a track length set based on a number of camera positions on which the processor is configured to simultaneously perform calculations;
store, in the memory, results obtained by performing an optimization calculation on the matrix for the map points and a matrix for at least one camera position, among the camera positions, corresponding to the map points; and
based on the results stored in the memory,
wherein the processor is further configured to perform an optimization calculation on matrices corresponding to the plurality of sub-tracks based on a plurality of shift registers, the plurality of shift registers corresponding to the plurality of sub-tracks, and
wherein pieces of data processed through the plurality of shift registers are sequentially input to a timing controller and the timing controller is configured to simultaneously transmit the pieces of data.

13. The electronic device of claim 12, wherein the processor is further configured to: store, in the memory, a first result obtained by performing an optimization calculation on a matrix for a first map point corresponding to a first sub-track of the plurality of sub-tracks, and on a matrix for a camera position corresponding to the first map point; and obtain a second result by performing an optimization calculation on a matrix for a second map point corresponding to a second sub-track following the first sub-track in the plurality of sub-tracks, and on a matrix for a camera position corresponding to the second map point.

14. The electronic device of claim 13, wherein based on obtaining the second result, the processor is further configured to reuse a matrix in at least a portion of the second sub-track, the portion corresponding to the first sub-track.

* * * * *